Figure 1:
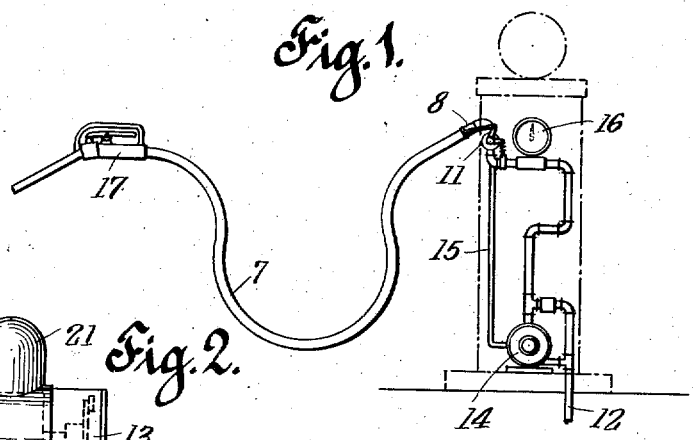

G. W. STEDWELL

Oct. 18, 1932. LIQUID DISPENSING APPARATUS Re. 18,632

Original Filed June 16, 1930

INVENTOR
George W. Stedwell
BY Philip S. McGean
ATTORNEY

Reissued Oct. 18, 1932

Re. 18,632

UNITED STATES PATENT OFFICE

GEORGE W. STEDWELL, OF BROOKLYN, NEW YORK

LIQUID DISPENSING APPARATUS

Original No. 1,775,441, dated September 9, 1930, Serial No. 461,422, filed June 16, 1930. Application for reissue filed September 3, 1932. Serial No. 631,741.

This invention relates to apparatus of the type in which gasoline or other liquid is delivered through a flexible hose under control of a nozzle valve.

The objects of the invention are to provide simple, practical and efficient mechanism for throwing a switch, or operating a valve or other flow governing mechanism from the nozzle end of the hose.

One of the important features of the invention is the provision of means by which pulling on the hose is made effective to operate the desired control mechanism.

Other novel features of the invention will appear as the specification proceeds.

The drawing accompanying and forming part of the specification illustrates several different forms the invention may take, but it should be understood that the structure may otherwise vary without departure from the true spirit and broad scope of the invention.

Figure 2:
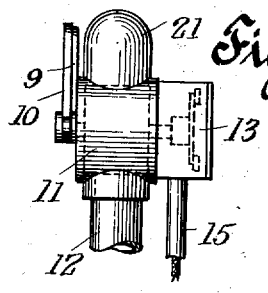
Figure 3:
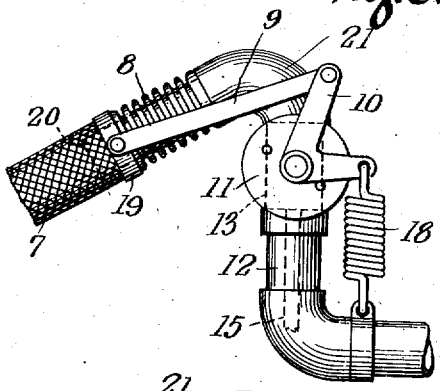
Figure 5:
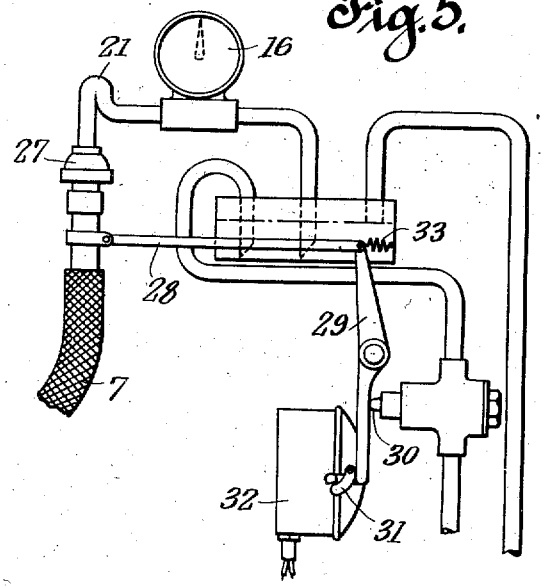
Figure 4:
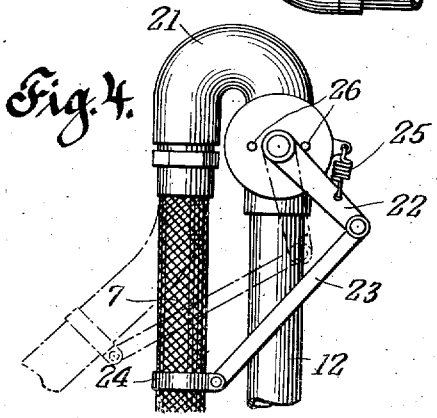

Fig. 1 is a general side view showing the invention incorporated in a gasoline dispensing pump or stand. Figs. 2 and 3 are broken details of the control means shown in Fig. 1; Figs. 4 and 5 are broken details illustrating other embodiments of the invention.

The present invention is a continuation in part of applications 323,411, filed December 3, 1928, and 324,761, filed December 8, 1928, and issued as Patents 1,713,102 of May 14, 1929, and 1,717,274 of June 11, 1929, respectively.

In the first illustrated form of the invention, Figs. 1, 2 and 3, the control is effected by means of hose 7 through the medium of an extensible or telescopic section provided at the upper end of the hose and shown as a sylphon 8 and enabling in effect a "stretching" of the hose, which through the medium of a link 9 operates a bell crank lever 10 connected to a valve 11 controlling flow through the supply pipe 12 and a switch 13 governing operation of the pump 14. The wiring from the switch to the pump motor is indicated only in a general way at 15 in Fig. 1 and it should be understood that when this switch is closed by pulling on the hose, the pump motor will be operated to impel a flow of liquid through the supply pipe 12, meter 16 and hose 7. The amount of liquid delivered may be accurately determined by a nozzle valve 17 at the discharge end of the hose and the pump may be started and stopped by pulling or releasing the pull on the hose, a return spring such as indicated at 18 being provided to turn off the switch and the valve and to retract the hose when pull on the same is released. This return spring is made heavy enough to accomplish this purpose and it is shown as directly connected to one arm of the bell crank lever 10. To facilitate the extension and contraction of the hose joint and prevent wear on the sylphon, the hose is shown as having a collar 19 at its upper end slidingly fitting over a neck 20 on the elbow or goose neck 21 at the upper end of the hose line.

In the second embodiment illustrated, the switch and valve are operated by a straight lever 22 connected by a link 23 with a band 24 encircling the suspended portion of the hose below the goose neck. A return spring 25 is provided in this instance and in both the case last described and in the first form illustrated, suitable stops 26 are indicated for limiting the switch throwing and valve operating movements.

In the Fig. 5 form of construction, the upper end portion of the hose is equipped with a swivel or swing joint 27 and the swinging portion below this is connected by a link 28 with a lever 29 operating a supply valve 30 in the flow line and engaging the operating lever 31 of the switch 32, which controls the pump motor.

In all forms of the invention, it will be observed that the flow operation may be governed by simply pulling on the hose to start the flow and by releasing pull on the hose to stop the flow. The natural effect of the hose to swing straight down from the goose-neck at the top will have a tendency to restore the parts in Figs. 4 and 5, but this shutting off operation may be made certain by the suitable return springs 25 and 33. The parts may be arranged, so that pull on the swinging portion of the hose in any direction will be effective to throw the switch or operate the valve, or both, so that the attendant may conveniently actuate the control no matter in what position he may be standing or no matter what position he may be in regard to the pump stand. In constructions like those shown in Figs. 4 and 5, it will be evident, the same control may be effected by a push action on the hose toward the left in these views instead of a straight pull toward the left, so that the attendant may accomplish the same control effects either by pulling toward the left or if he be at the right of the stand by pushing back on the hose, so as to effect the deflection on the hose as indicated in the dotted lines in Fig. 4. It will be understood therefore that the invention comprehends the deflection or shifting of the hose adjacent its supported end to effect mechanical actuation of the flow control mechanism, whether the latter be a switch or some other form of device. By this invention, the attendant at a pump stand is enabled to deliver continuously any desired volumes of liquid by simply operating the nozzle valve to start or to stop the flow and by using the hose in effect as a mechanical handle for throwing the switch or other control to start and stop the pump motor or the like, the meter at the pump stand at all times showing the amounts delivered in this way. The invention also involves a safety feature in that in the forms illustrated, the pump motor is automatically shut off as soon as the actuating pull on the hose is released. Inattention or carelessness on the part of the operator therefore results in the flow being shut off. The terms employed herein are used in a descriptive rather than in a limiting sense, it being understood that equivalents may be employed as for instance, in place of the return springs 18, 25 and 33, counter-balance weights, pressure actuated means or the like, may be used.

What is claimed is:

1. A liquid metering and delivery system comprising a liquid delivery line terminating in a flexible hose, suspended for pulling movement and having a manually operable nozzle valve by which discharge of liquid from the hose may be accurately determined, an electric pump for supplying liquid under pressure through said delivery line and hose, a meter in the delivery line for showing the amounts of liquid delivered by the hose under control of said nozzle valve, a switch for starting and stopping the electric pump and flexible mechanical connections from said suspended pull portion of the hose to said switch for operating the latter to start and stop the pump by pulling movements on the hose, and whereby various desired quantities of liquid may be measured and delivered by control exercised at the nozzle end of the hose and the hose be drained by operation of the nozzle valve after shutting off the pump and the hose be left free of pressure after each delivery.

2. A liquid metering and delivery system comprising a liquid delivery line terminating in a flexible hose, suspended for pulling movement and having a manually operable nozzle valve by which discharge of liquid from the hose may be accurately determined, an electric pump for supplying liquid under pressure through said delivery line and hose, a meter in the delivery line for showing the amounts of liquid delivered by the hose under control of said nozzle valve, a switch for starting and stopping the electric pump and flexible mechanical connections from said suspended pull portion of the hose to said switch for operating the latter to start and stop the pump by pulling movements on the hose, and whereby various desired quantities of liquid may be measured and delivered by control exercised at the nozzle end of the hose and the hose be drained by operation of the nozzle valve after shutting off the pump and the hose be left free of pressure after each delivery and valve means in said system connected to be actuated by said hose pull connections.

3. A liquid dispensing apparatus comprising a pump stand, a delivery conduit freely suspended exteriorly to the stand, means within the stand for delivering liquid to said conduit, said means including an electric pump and a switch for starting and stopping the pump, a tension member secured to the said conduit below its point of suspension and extending into the stand, means operatively connecting the inner end of said member to said switch so that by pulling the said conduit outwardly from the stand the switch will be moved to starting position, and means for restoring the switch to stopping position when the pull on the conduit is released.

4. A liquid dispensing apparatus comprising a pump stand, a delivery line including a fixed conduit within the stand and projecting at one end therefrom and a hose without the stand and suspended from said projecting end, said means including an electric pump and a switch for starting and stopping the pump, a tension member secured to the hose near its point of suspension and extending into the stand, means operatively connecting the inner end of said member to said switch so that by pulling the hose outwardly from the stand the switch will be moved to starting position, and means for restoring the switch to stopping position when the pull on the hose is released.

5. A liquid dispensing and metering apparatus comprising a pump stand, a delivery hose suspended exteriorly to the stand, means within the stand for delivering liquid to said hose, said means including an electric pump and a switch for starting and stopping the pump, said hose having a nozzle valve at its delivery end for controlling the discharge of liquid, a meter for measuring the liquid discharged, a control valve between the pump and the meter, a tension member secured to the hose below its point of suspension and extending into the stand, means operatively connecting the inner end of said member to said switch and to said control valve so that by pulling the hose out of normal depending position said switch will be moved to starting position and the control valve will be opened, and means urging the switch to stopping position and the control valve to closed position so as to stop the pump and cut off flow through the meter when the pull on the hose is released.

6. A liquid dispensing apparatus comprising a delivery line including a fixed portion and a suspended portion movable angularly with respect to the fixed portion, an electric pump for supplying liquid to the line, a switch for starting and stopping the pump, flexible connecting means attached at one end to said suspended portion below its point of suspension and at the other end to the switch whereby the switch may be pulled to starting position by pulling said portion out of normal depending position, and means urging the switch to stopping position to stop the pump when the pull on said portion is released.

7. A liquid dispensing apparatus comprising a delivery line having a fixed portion and a depending flexible portion suspended therefrom, an electric pump for supplying liquid to the line, a controller for said pump, and connecting means from the controller to said depending portion below its point of suspension whereby the pump may be controlled by swinging said flexible portion from and toward its normal depending position.

In testimony whereof, I affix my signature.

GEORGE W. STEDWELL.